United States Patent
Ahmed et al.

(10) Patent No.: US 10,245,917 B2
(45) Date of Patent: Apr. 2, 2019

(54) EXHAUST GAS HEAT RECOVERY SYSTEM

(71) Applicant: GM GLOBAL TECHNOLOGY OPERATIONS LLC, Detroit, MI (US)

(72) Inventors: Adeel Ahmed, Troy, MI (US); Brian L. Spohn, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1421 days.

(21) Appl. No.: 13/689,862

(22) Filed: Nov. 30, 2012

(65) Prior Publication Data

US 2013/0087304 A1 Apr. 11, 2013

Related U.S. Application Data

(63) Continuation-in-part of application No. 12/915,764, filed on Oct. 29, 2010, now abandoned, and a continuation-in-part of application No. 12/957,755, filed on Dec. 1, 2010, now Pat. No. 8,463,495.

(51) Int. Cl.
| | |
|---|---|
| *B60H 1/00* | (2006.01) |
| *F01N 5/02* | (2006.01) |
| *F16H 57/04* | (2010.01) |

(52) U.S. Cl.
CPC .......... *B60H 1/00271* (2013.01); *F01N 5/02* (2013.01); *F16H 57/0413* (2013.01); *F01N 2240/02* (2013.01); *F01P 2060/16* (2013.01); *F16H 57/0417* (2013.01); *Y02T 10/16* (2013.01)

(58) Field of Classification Search
CPC ... F01P 11/08; F01P 7/165; F01P 3/12; B60H 1/00271; F01N 5/02; F16H 57/0413
See application file for complete search history.

(56) References Cited

U.S. PATENT DOCUMENTS

| | | | |
|---|---|---|---|
| 6,772,715 B2 * | 8/2004 | Pfeffinger et al. ......... | 123/41.31 |
| 2004/0140366 A1 * | 7/2004 | Uzkan .............. | 237/41 |
| 2005/0167169 A1 * | 8/2005 | Gering et al. .............. | 180/65.2 |
| 2010/0175650 A1 * | 7/2010 | Suzuki et al. ............. | 123/90.17 |
| 2011/0088378 A1 * | 4/2011 | Prior et al. ..................... | 60/320 |
| 2012/0048504 A1 * | 3/2012 | Park et al. ..................... | 165/41 |

FOREIGN PATENT DOCUMENTS

| | | |
|---|---|---|
| CN | 102032069 A | 4/2011 |
| CN | 202494245 U | 10/2012 |
| DE | 10335298 A1 | 6/2004 |
| DE | 102008007597 A1 | 8/2009 |
| DE | 102011116923 A1 | 5/2012 |

* cited by examiner

*Primary Examiner* — Jacob Amick
(74) *Attorney, Agent, or Firm* — Quinn IP Law

(57) ABSTRACT

A powertrain includes an engine, an exhaust system including an exhaust passageway in fluid communication with the engine, an exhaust gas heat exchanger, a transmission having a transmission cooling system, a transmission heat exchanger, a heater core, a pump, and an engine coolant circuit. The engine coolant circuit provides fluid communication between the engine, the exhaust gas heat exchanger, the transmission heat exchanger, the heater core, and the pump. The exhaust gas heat exchanger is operatively connected to the exhaust system and configured to transfer heat between the engine coolant circuit and the exhaust system. The transmission heat exchanger is operatively connected to the transmission cooling system and configured to transfer heat between the engine coolant circuit and the transmission cooling system.

15 Claims, 3 Drawing Sheets

EXHAUST GAS HEAT RECOVERY SYSTEM

CROSS REFERENCE TO RELATED APPLICATIONS

This application is a continuation in part of U.S. application Ser. No. 12/915,764, filed Oct. 29, 2010, and U.S. application Ser. No. 12/957,755, filed Dec. 1, 2010, both of which are hereby incorporated by reference in their entireties.

STATEMENT REGARDING FEDERALLY SPONSORED RESEARCH OR DEVELOPMENT

This invention was made with U.S. Government support under Agreement No. DE-FC26-08NT04386 awarded by the Department of Energy. The U.S. Government may have certain rights in this invention.

TECHNICAL FIELD

This disclosure relates to control of exhaust gas heat reclaim, recovery, or recirculation systems for vehicles.

BACKGROUND

Internal combustion engines typically produce energy by combustion of a fuel with air in a combustion chamber. The products of combustion, including exhaust gases—are expelled through an exhaust system.

SUMMARY

A powertrain includes an engine, an exhaust system including an exhaust passageway in fluid communication with the engine, an exhaust gas heat exchanger, a transmission having a transmission cooling system, a transmission heat exchanger, a heater core, a pump, and an engine coolant circuit. The engine coolant circuit provides fluid communication between the engine, the exhaust gas heat exchanger, the transmission heat exchanger, the heater core, and the pump. The exhaust gas heat exchanger is operatively connected to the exhaust system and configured to transfer heat between the engine coolant circuit and the exhaust system. The transmission heat exchanger is operatively connected to the transmission cooling system and configured to transfer heat between the engine coolant circuit and the transmission cooling system.

The engine coolant circuit enables the transfer of heat among the various components of the powertrain, and includes the ability to recapture heat in the exhaust gas for heating transmission oil, the heater core (for heating a passenger compartment), etc.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
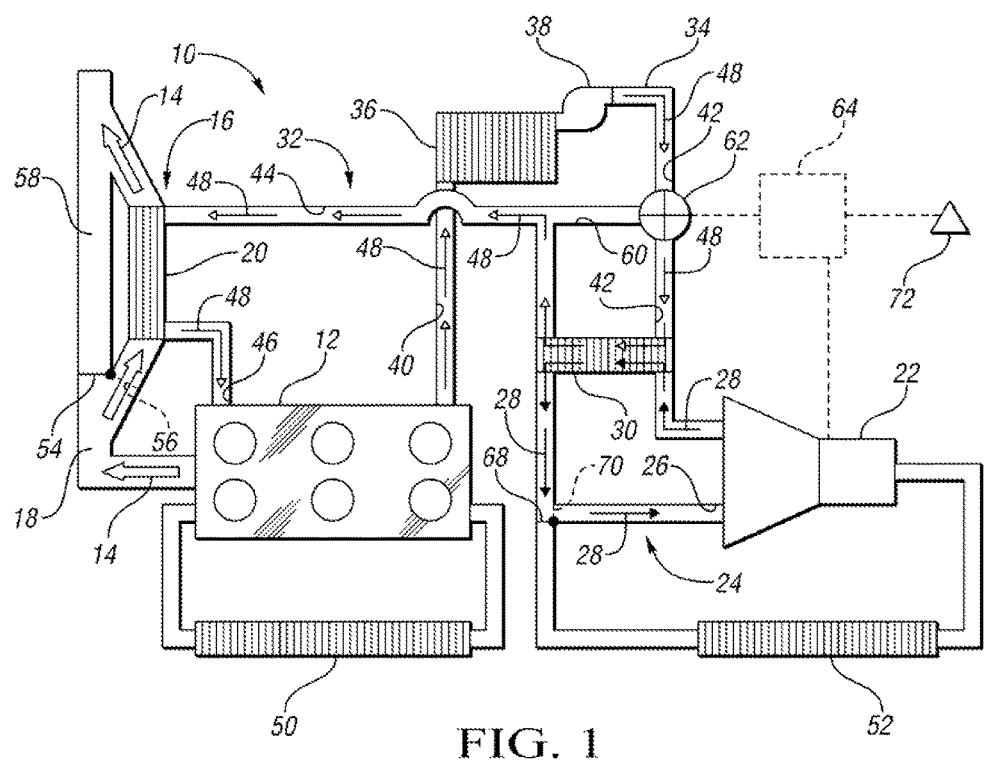
FIG. 1 is a schematic diagram of an exemplary hybrid vehicle powertrain having an exhaust gas heat recovery (EGHR) system in communication with an engine and a transmission.

Referring to the drawings, wherein like reference numbers correspond to like or similar components whenever possible throughout the several figures, there is shown in FIG. 1 a powertrain 10 including an engine 12, which produces exhaust gases 14 during engine operation. An exhaust system 16 defines an exhaust passageway 18 in fluid communication with the engine 12 such that the exhaust gases 14 are transmitted through the exhaust passageway 18. An exhaust gas heat exchanger 20 is operatively connected to the exhaust system 16 such that the exhaust gas 14 in the passageway 18 is in thermal communication with the exhaust gas heat exchanger 20. Thus, heat from the exhaust gas 14 in the exhaust passageway 18 is transferred to the exhaust gas heat exchanger 20.

The powertrain 10 includes a transmission 22 having an input member (not shown) operatively connected to the crankshaft (not shown) of the engine 12; accordingly, the engine 12 is configured to transmit torque to the transmission 22. The transmission 22 may be a hybrid transmission having one or more electric machines (not shown), i.e., motor/generators. Alternatively, the powertrain 10 may include one or more electric machines acting directly on the engine output or the transmission input.

The transmission 22 has a transmission oil circuit, or transmission cooling system 24. The transmission cooling system 24 defines a passageway 26 through which transmission coolant 28 flows during transmission operation. A transmission heat exchanger 30 is operatively connected to the transmission cooling system 24 such that the transmission coolant 28 in the passageway 26 is in thermal communication with the transmission heat exchanger 30. Thus, heat from the transmission heat exchanger 30 is transferred to the coolant 28. The transmission coolant 28 may be a lubricating and cooling oil.

An exhaust gas heat recovery (EGHR) system 32 includes an engine coolant circuit 34 that provides fluid communication between the engine 12, a heater core 36, the transmission heat exchanger 30, the exhaust gas heat exchanger 20, and a pump 38. In the embodiment depicted in FIG. 1, the engine coolant circuit 34 defines a plurality of passageways 40, 42, 44, 46 that connect the pump 38, the engine 12, the heater core 36, the transmission heat exchanger 30, and the exhaust gas heat exchanger 20 in series. Thus, in the embodiment depicted, engine coolant 48 flows from the engine 12 to the heater core 36 via a first passageway 40; the coolant 48 then flows from the heater core 36 to the pump 38; from the pump 38 the coolant 48 flows through a second passageway 42 to the transmission heat exchanger 30; from the transmission heat exchanger 30 the coolant 48 flows through a third passageway 44 to the exhaust gas heat exchanger 20; and from the exhaust gas heat exchanger 20 the coolant 48 flows through a fourth passageway 46 back to the engine 12.

As the coolant 48 flows through the exhaust gas heat exchanger 20, the exhaust gas heat exchanger 20 is in thermal communication with the coolant 48. Accordingly, the exhaust gas heat exchanger 20 is configured to transfer heat between the engine coolant circuit 34 and the exhaust system 16, and, more specifically, the exhaust gas heat exchanger 20 is configured to transfer heat from the exhaust 14 to the coolant 48, thereby warming the coolant 48.

Similarly, as the coolant 48 flows through the transmission heat exchanger 30, the transmission heat exchanger 30 is in thermal communication with the coolant 48. Accordingly, the transmission heat exchanger 30 is configured to transfer heat between the engine coolant circuit 34 and the transmission cooling system 24, and, more specifically, the transmission heat exchanger 30 is configured to transfer heat between the engine coolant 48 and the transmission coolant 28.

The engine coolant circuit 34 is supplied with pressurized coolant by a primary pump (not separately shown) incorporated with the engine 12. The primary pump may be a mechanical pump driven by rotation of the engine crankshaft. Depending upon the operating conditions of the EGHR system 32, the coolant 48 in the engine coolant circuit 34 may be heated by the exhaust gases 14 from the engine 12.

The heater core 36 allows heat to be transferred from the coolant 48 leaving the engine 12 to the cabin (passenger compartment) of the vehicle in which the powertrain 10 is installed. The powertrain 10 also includes an engine radiator 50 configured to selectively dissipate heat from the engine 12 to ambient air flowing through the engine radiator 50. A thermostat (not shown) may be used to control flow of coolant from the engine 12 through the engine radiator 50. A transmission radiator 52 is an oil-to-air heat exchanger configured to selectively dissipate heat from the transmission cooling system 24 of the transmission 22 to ambient air flowing through the transmission radiator 52.

The transmission heat exchanger 30, which may also be referred to as a central heat exchanger, is an oil-to-water heat exchanger which allows heat to be transferred from the engine coolant circuit 34 to the transmission cooling system 24 in order to warm the transmission 22 and reduce slip loss. Furthermore, the transmission heat exchanger 30 also allows the transmission 22 and transmission radiator 52 to dissipate excess heat from the engine 12 during hot or extreme conditions.

The pump 38 is an auxiliary pump. The auxiliary pump 38 may be used to add pressure and increase flow through the engine coolant circuit 34. Furthermore, when the engine 12 is turned off or un-fueled by the hybrid vehicle controls (not shown separately) the auxiliary pump 38 may be used as the main pressure source for the engine coolant circuit 34. Therefore, the auxiliary pump 38 may be used to supplement the primary pump incorporated into the engine 12, may be used as the only pump when the engine 12 and the primary pump are not operating, or may be used as the sole pump for the engine coolant circuit 34.

The engine coolant circuit 34 thus transfers heat between and among various powertrain and vehicle components, including the engine 12, the exhaust system 16, the heater core 36 (and thus the interior compartment of the vehicle), and the transmission 22 (via the transmission heat exchanger 30 and the transmission cooling system 24).

An EGHR bypass valve 54 controls flow of exhaust gases through the EGHR heat exchanger 20. The EGHR bypass valve 54 is shown in its non-bypass position, which allows flow of exhaust gases 14 through the EGHR heat exchanger 20 and allows heat-exchange communication between the exhaust gases 14 and the engine coolant circuit 34. When the EGHR bypass valve 54 is switched, flipped, or otherwise actuated to a bypass position—shown in FIG. 1 as a dashed line and labeled as element 56—exhaust gases 14 leaving the engine 12 are not allowed to pass through the EGHR heat exchanger 20, but are instead directed through a bypass passageway 58 defined by the exhaust system 16.

The EGHR bypass valve 54 may be controlled by a solenoid, a mechanical thermostat, a wax motor, vacuum actuator, or other suitable controls, and may be switched between the non-bypass position and the bypass position at varying temperatures and conditions. The EGHR bypass valve 54 may be controlled based upon the monitored engine temperature or based upon the temperature of the coolant 48 flowing through the EGHR heat exchanger 20. For example, and without limitation, the EGHR bypass valve 54 may be a wax motor driven by coolant temperatures of seventy-two degrees Celsius or greater in the engine coolant circuit 34. The set-point temperature for the EGHR bypass valve 54, and other settings within the EGHR system 10, is exemplary and illustrative only. The specific values for set points will be determined based upon the specific configuration of the EGHR system 32 and the vehicle into which it is incorporated.

Different powertrain operating conditions may result in differing heat transfer needs among the various components. Depending on the temperatures and operating conditions, some of the powertrain components may not need the coolant 48 to transfer heat thereto, or it may be desirable to prioritize which of the components receives heat from the coolant 48. Accordingly, the engine coolant circuit 34 includes at least one bypass passageway in parallel with at least one of the components (i.e., the transmission heat exchanger 30, the pump 38, and the heater core 36) so that the coolant 48 can bypass the component while flowing through the engine coolant circuit 34. That is, the engine coolant circuit 34 defines a bypass passageway that bypasses one of the transmission heat exchanger 30, the heater core 36, and the pump 38. A valve is configured to control fluid flow through the bypass passageway.

For example, it may be desirable in some circumstances not to transfer heat from the coolant 48 to the transmission 22. In the embodiment of FIG. 1, the engine coolant circuit 34 defines a transmission heat exchanger bypass 60 in parallel with the transmission heat exchanger 30. The transmission heat exchanger bypass 60 provides fluid communication between the heater core 36 and the exhaust gas heat exchanger 20 (with the pump 38 between).

The circuit 34 includes a transmission heat exchanger bypass valve 62 operatively connected to the fluid circuit 34 and configured to control fluid flow (i.e., engine coolant flow) through the transmission heat exchanger 30 and the transmission heat exchanger bypass 60. The valve 62 is a two-way valve that is selectively movable between two positions. In a first position, the valve 62 directs coolant 48 from the heater core 36 and the pump 38 to the transmission heat exchanger 30. In a second position, the valve 62 directs coolant 48 from the heater core 36 and the pump 38 to the transmission heat exchanger bypass 60 and the exhaust gas heat exchanger 20.

FIG. 1 shows a highly-schematic control architecture or control system 64 for the EGHR system 10. The control system 64 may include one or more components (not separately shown) with a storage medium and a suitable amount of programmable memory, which are capable of storing and executing one or more algorithms or methods to effect control of the EGHR system 32. Each component of the control system 64 may include distributed controller architecture, such as a microprocessor-based electronic control unit (ECU). Additional modules or processors may be present within the control system 64.

A transmission thermostat 68 controls flow between the transmission cooling system 24 and the transmission radiator 52. The transmission thermostat 68 is shown in its direct return position, which directs flow of coolant 28 returning from the transmission heat exchanger 30 back to the transmission 22 without passing through the transmission radiator 52. When the transmission thermostat 68 is switched, flipped, or otherwise actuated to a radiator position—shown in FIG. 1 as a dashed line and labeled as element 70—coolant 28 returning from the transmission heat exchanger 30 is directed through the transmission radiator 52 before returning to the transmission 22. An ambient air sensor 72 monitors the temperature of the ambient air around (and flowing through) the vehicle and is in communication with the control system 64.

Figure 2:
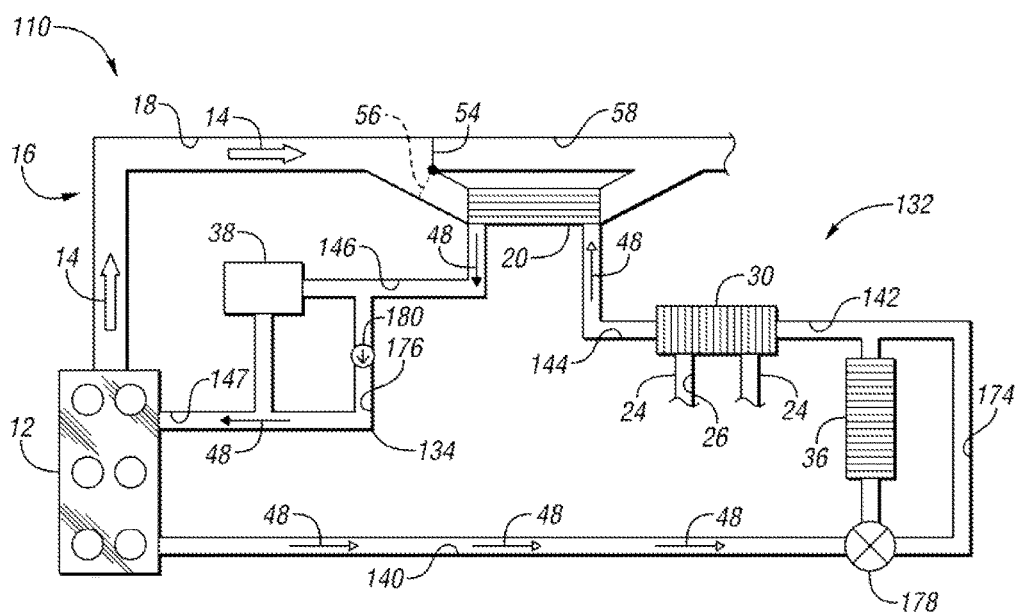
FIG. 2 is a schematic diagram of another powertrain having an alternative EGHR system configuration in accordance with the claimed invention.

Referring to FIG. 2, wherein like reference numbers refer to like components from FIG. 1, another powertrain 110 is schematically depicted. The powertrain 110 includes an engine 12, which produces exhaust gases 14 during engine operation. An exhaust system 16 defines an exhaust passageway 18 in fluid communication with the engine 12 such that the exhaust gases 14 are transmitted through the exhaust passageway 18. An exhaust gas heat exchanger 20 is operatively connected to the exhaust system 16 such that the exhaust gas 14 in the passageway 18 is in thermal communication with the exhaust gas heat exchanger 20.

The powertrain 110 includes a transmission, such as the one shown at 22 in FIG. 1, having an input member (not shown) operatively connected to the crankshaft (not shown) of the engine 12. The transmission has a transmission oil circuit, or transmission cooling system 24, only part of which is shown in FIG. 2, but which may be substantially the same as the one shown in FIG. 1. A transmission heat exchanger 30 is operatively connected to the transmission cooling system such that the transmission coolant in the passageway 26 is in thermal communication with the transmission heat exchanger 30. Thus, heat from the transmission heat exchanger 30 is transferred to the transmission coolant 28. The transmission coolant 28 may be a lubricating and cooling oil.

An exhaust gas heat recovery (EGHR) system 132 includes an engine coolant circuit 134 that provides fluid communication between the engine 12, a heater core 36, the transmission heat exchanger 30, the exhaust gas heat exchanger 20, and a pump 38. In the embodiment depicted in FIG. 2, the engine coolant circuit 134 defines a plurality of passageways 140, 142, 144, 146, 147 that connect the pump 38, the engine 12, the heater core 36, the transmission heat exchanger 30, and the exhaust gas heat exchanger 20 in series. In the embodiment depicted in FIG. 2, the engine coolant circuit 134 defines a first passageway 140 that provides fluid communication between the engine 12 and the heater core 36, a second passageway 142 that provides fluid communication between the heater core 36 and the transmission heat exchanger 30, a third passageway 144 that provides fluid communication between the transmission heat exchanger 30 and the exhaust gas heat exchanger 20, a fourth passageway 146 that provides fluid communication between the exhaust gas heat exchanger 20 and the pump 38, and a fifth passageway 147 that provides fluid communication between the pump 38 and the engine 12.

As the coolant 48 flows through the exhaust gas heat exchanger 20, the exhaust gas heat exchanger 20 is in thermal communication with the coolant 48. Accordingly, the exhaust gas heat exchanger 20 is configured to transfer heat between the engine coolant circuit 134 and the exhaust system 16, and, more specifically, the exhaust gas heat exchanger 20 is configured to transfer heat from the exhaust 14 to the coolant 48, thereby warming the coolant 48.

Similarly, as the coolant 48 flows through the transmission heat exchanger 30, the transmission heat exchanger 30 is in thermal communication with the coolant 48. Accordingly, the transmission heat exchanger 30 is configured to transfer heat between the engine coolant circuit 134 and the transmission cooling system 24, and, more specifically, the transmission heat exchanger 30 is configured to transfer heat between the engine coolant 48 and the transmission coolant.

The engine coolant circuit 134 of FIG. 2 defines two optional bypasses 174, 176. It may be desirable in some circumstances not to transfer heat from the coolant 48 to the heater core 36. In the embodiment of FIG. 2, the engine coolant circuit 134 defines a heater core bypass 174 in parallel with the heater core 36. The heater core bypass 174 provides fluid communication between the engine 12 and the transmission heat exchanger 30, thereby bypassing the heater core 36.

The circuit 134 includes a heater core bypass valve 178 operatively connected to the fluid circuit 134 and configured to control fluid flow (i.e., engine coolant flow) through the heater core 36 and the heater core bypass 174. The valve 178 is a two-way valve that is selectively movable between two positions. In a first position, the valve 178 directs coolant 48 from the engine 12 to the heater core 36. In a second position, the valve 178 directs coolant 48 from the engine 12 to the heater core bypass 174 and the transmission heat exchanger 30.

It may be desirable in some circumstances to bypass the auxiliary pump 38. In the embodiment of FIG. 2, the engine coolant circuit 134 defines a pump bypass 176 in parallel with the pump 38. The pump bypass 176 provides fluid communication between the exhaust gas heat exchanger 20 and engine 12, thereby bypassing the pump 38. The circuit 134 includes a one-way valve 180 that restricts flow through the pump bypass 176 to one direction.

Figure 3:
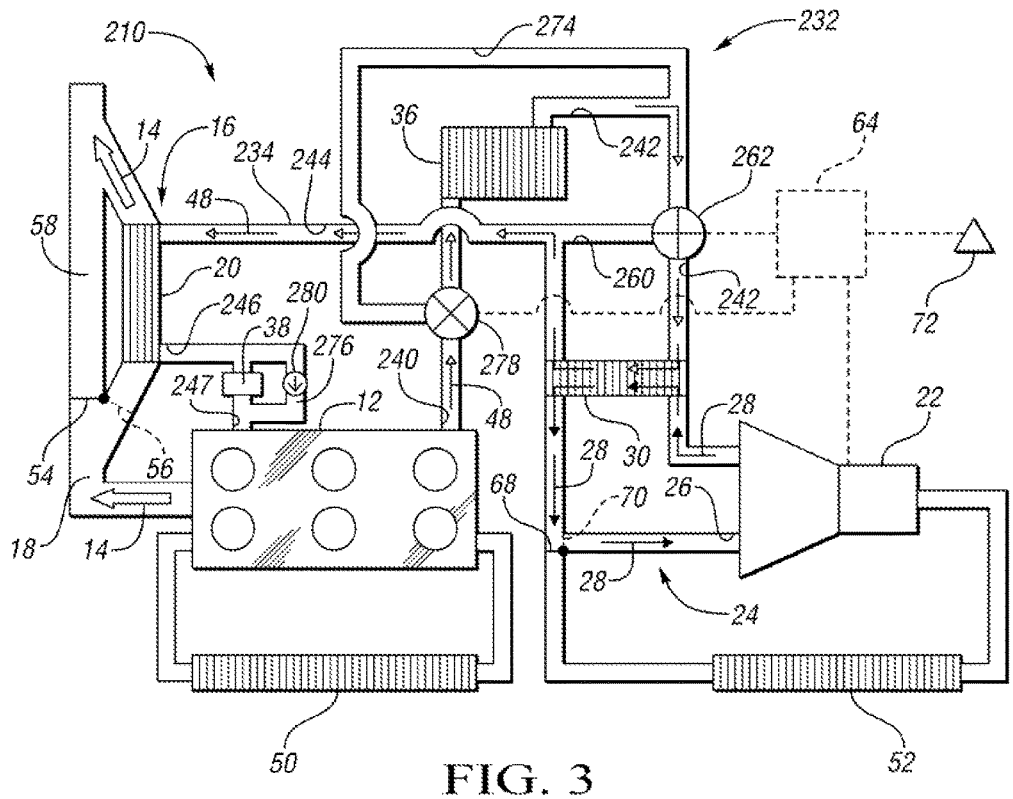
FIG. 3 is a schematic diagram of yet another powertrain having another alternative EGHR system configuration in accordance with the claimed invention.

Referring to FIG. 3, wherein like reference numbers refer to like components from FIGS. 1 and 2, another powertrain 210 configuration is schematically shown. The powertrain 210 is substantially similar to the powertrain 10 of FIG. 1, except that pump 38 is between the exhaust gas heat exchanger 20 and the engine 12 instead of between the heater core 36 and the valve 62. Also, the EGHR system 232 of FIG. 3 includes a heater core bypass 274 and a pump bypass 276.

More specifically, the exhaust gas heat recovery (EGHR) system 232 includes an engine coolant circuit 234 that provides fluid communication between the engine 12, the heater core 36, the transmission heat exchanger 30, the exhaust gas heat exchanger 20, and the pump 38. In the embodiment depicted in FIG. 3, the engine coolant circuit 234 defines a plurality of passageways 240, 242, 244, 246, 247 that connect the pump 38, the engine 12, the heater core 36, the transmission heat exchanger 30, and the exhaust gas heat exchanger 20 in series. In the embodiment depicted in FIG. 3, the engine coolant circuit 234 defines a first passageway 240 that provides fluid communication between the engine 12 and the heater core 36, a second passageway 242 that provides fluid communication between the heater core 36 and the transmission heat exchanger 30, a third passageway 244 that provides fluid communication between the transmission heat exchanger 30 and the exhaust gas heat exchanger 20, a fourth passageway 246 that provides fluid communication between the exhaust gas heat exchanger 20 and the pump 38, and a fifth passageway 247 that provides fluid communication between the pump 38 and the engine 12.

The engine coolant circuit 234 defines a heater core bypass 274 in parallel with the heater core 30. The heater core bypass 274 provides fluid communication between the engine 12 and the transmission heat exchanger 30, thereby bypassing the heater core 36.

The circuit 234 includes a heater core bypass valve 278 operatively connected to the fluid circuit 234 and configured to control fluid flow (i.e., engine coolant flow) through the heater core 36 and the heater core bypass 274. The valve 278 is a two-way valve that is selectively movable between two positions. In a first position, the valve 278 directs coolant 48 from the engine 12 to the heater core 36. In a second position, the valve 278 directs coolant 48 from the engine 12 to the heater core bypass 274 and the transmission heat exchanger 30.

The engine coolant circuit 234 defines a pump bypass 276 in parallel with the pump 38. The pump bypass 276 provides fluid communication between the exhaust gas heat exchanger 20 and engine 12, thereby bypassing the pump 38. The circuit 234 includes a one-way valve 280 that restricts flow through the pump bypass 176 to one direction.

The engine coolant circuit 234 defines a transmission heat exchanger bypass 260 in parallel with the transmission heat exchanger 30. The transmission heat exchanger bypass 260 provides fluid communication between the heater core 36 and the exhaust gas heat exchanger 20. The circuit 234 includes a transmission heat exchanger bypass valve 262 operatively connected to the fluid circuit 234 and configured to control fluid flow (i.e., engine coolant flow) through the transmission heat exchanger 30 and the transmission heat exchanger bypass 260. The valve 262 is a two-way valve that is selectively movable between two positions. In a first position, the valve 262 directs coolant 48 from the heater core 36 or the heater core bypass 274 to the transmission heat exchanger 30. In a second position, the valve 262 directs coolant 48 from the heater core 36 to the transmission heat exchanger bypass 260 and the exhaust gas heat exchanger 20.

Figure 4:
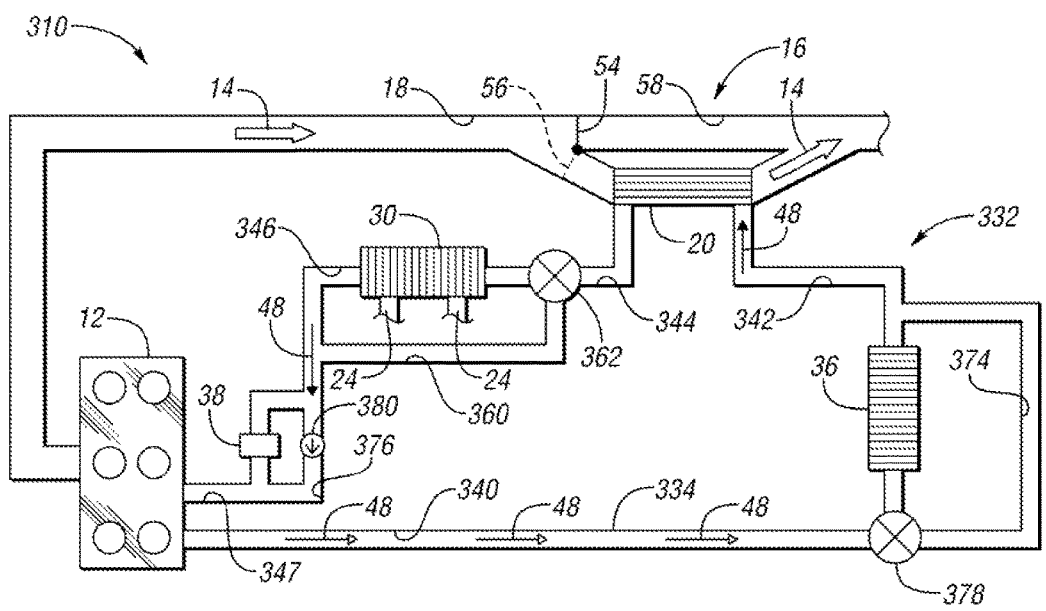
FIG. 4 is a schematic diagram of yet another powertrain having another alternative EGHR system configuration in accordance with the claimed invention.

Referring to FIG. 4, wherein like reference numbers refer to like components from FIGS. 1-3, powertrain 310 includes an EGHR system 332 having an engine coolant circuit 334 that provides fluid communication between the engine 12, the heater core 36, the transmission heat exchanger 30, the exhaust gas heat exchanger 20, and the pump 38. In the embodiment depicted in FIG. 3, the engine coolant circuit 334 defines a plurality of passageways 340, 342, 344, 346, 347 that connect the pump 38, the engine 12, the heater core 36, the transmission heat exchanger 30, and the exhaust gas heat exchanger 20 in series.

More specifically, in the embodiment depicted in FIG. 3, the fluid circuit 334 defines a first passageway 340 that provides fluid communication between the engine 12 and the heater core 36, a second passageway 342 that provides fluid communication between the heater core 36 and the exhaust gas heat exchanger 20, a third passageway 344 that provides fluid communication between the exhaust gas heat exchanger 20 and the transmission heat exchanger 30, a fourth passageway 346 that provides fluid communication between the transmission heat exchanger 30 and the pump 38, and a fifth passageway 347 that provides fluid communication between the pump 38 and the engine 12.

Powertrain 310 is substantially similar to the powertrain 210 of FIG. 3, except that the transmission heat exchanger 30 is situated in series between the exhaust heat exchanger 20 and the pump 38 in powertrain 310, whereas the transmission heat exchanger in powertrain 210 is situated in series between the heater core and the exhaust gas heat exchanger. Powertrain 310 includes optional bypasses 360, 374, 376. More specifically, the engine coolant circuit 334 defines a transmission heat exchanger bypass 360 in parallel with the transmission heat exchanger 30 to provide fluid communication between the exhaust gas heat exchanger 20 and the pump 38. A transmission heat exchanger bypass valve 362 is operatively connected to the fluid circuit 334 and configured to control fluid flow through the transmission heat exchanger 30 and the transmission heat exchanger bypass 360.

The engine coolant circuit 334 also defines a heater core bypass 374 in parallel with the heater core 36 and that provides fluid communication between the engine 12 and the exhaust gas heat exchanger 20. The fluid circuit 334 includes a heater core bypass valve 378 operatively connected to the fluid circuit 334 and configured to control fluid flow through the heater core 36 and the heater core bypass 374.

The engine coolant circuit 334 further defines a pump bypass 376 in parallel with the pump 38 and that provides fluid communication between the transmission heat exchanger 30 and the engine 12. One-way valve 380 restricts flow through the pump bypass 376 to one direction.

Figure 5:
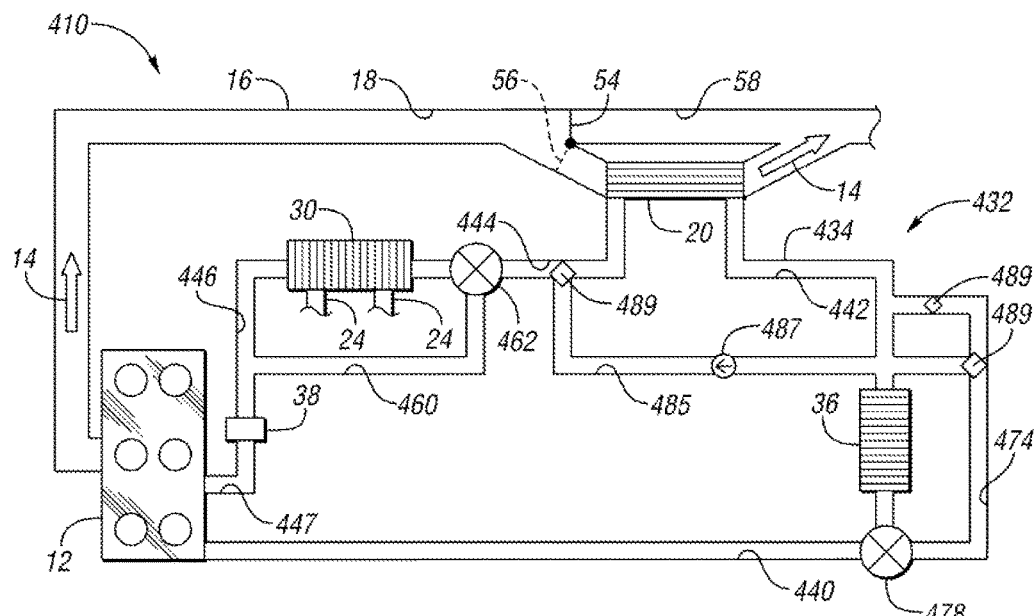
FIG. 5 is a schematic diagram of yet another powertrain having another alternative EGHR system configuration in accordance with the claimed invention.

Referring to FIG. 5, wherein like reference numbers refer to like components from FIGS. 1-4, powertrain 410 includes an EGHR system 432 having an engine coolant circuit 434 that provides fluid communication between the engine 12, the heater core 36, the transmission heat exchanger 30, the exhaust gas heat exchanger 20, and the pump 38. In the embodiment depicted in FIG. 5, the engine coolant circuit 434 defines a plurality of passageways 440, 442, 444, 446, 447 that connect the pump 38, the engine 12, the heater core 36, the transmission heat exchanger 30, and the exhaust gas heat exchanger 20 in series.

More specifically, in the embodiment depicted in FIG. 5, the fluid circuit 434 defines a first passageway 440 that provides fluid communication between the engine 12 and the heater core 36, a second passageway 442 that provides fluid communication between the heater core 36 and the exhaust gas heat exchanger 20, a third passageway 444 that provides fluid communication between the exhaust gas heat exchanger 20 and the transmission heat exchanger 30, a fourth passageway 446 that provides fluid communication between the transmission heat exchanger 30 and the pump 38, and a fifth passageway 447 that provides fluid communication between the pump 38 and the engine 12.

The engine coolant circuit 434 defines a transmission heat exchanger bypass 460 in parallel with the transmission heat exchanger 30 to provide fluid communication between the exhaust gas heat exchanger 20 and the pump 38. A transmission heat exchanger bypass valve 462 is operatively connected to the engine coolant circuit 434 and configured to control fluid flow through the transmission heat exchanger 30 and the transmission heat exchanger bypass 460.

The engine coolant circuit 434 also defines a heater core bypass 474 in parallel with the heater core 36 and that provides fluid communication between the engine 12 and the transmission heat exchanger 20. The fluid circuit 434 includes a heater core bypass valve 478 operatively connected to the fluid circuit 434 and configured to control fluid flow through the heater core 36 and the heater core bypass 474.

The engine coolant circuit 434 also defines an exhaust gas heat exchanger bypass 485 in parallel with the exhaust gas heat exchanger 20, and which provides fluid communication between the heater core bypass 474 and the transmission heat exchanger 30. A one-way valve that 487 restricts flow through the exhaust gas heat exchanger bypass 485 to one direction. The engine coolant circuit 434 also includes restriction orifices 489 as shown in FIG. 5. The EGHR system 432 of FIG. 5 provides reduced heater core bleed and reduced EGHR flow (hot side bleed) in heater core bypass for hot conditions, and could be used to provide exclusive transmission cooling when hot.

Figure 6:
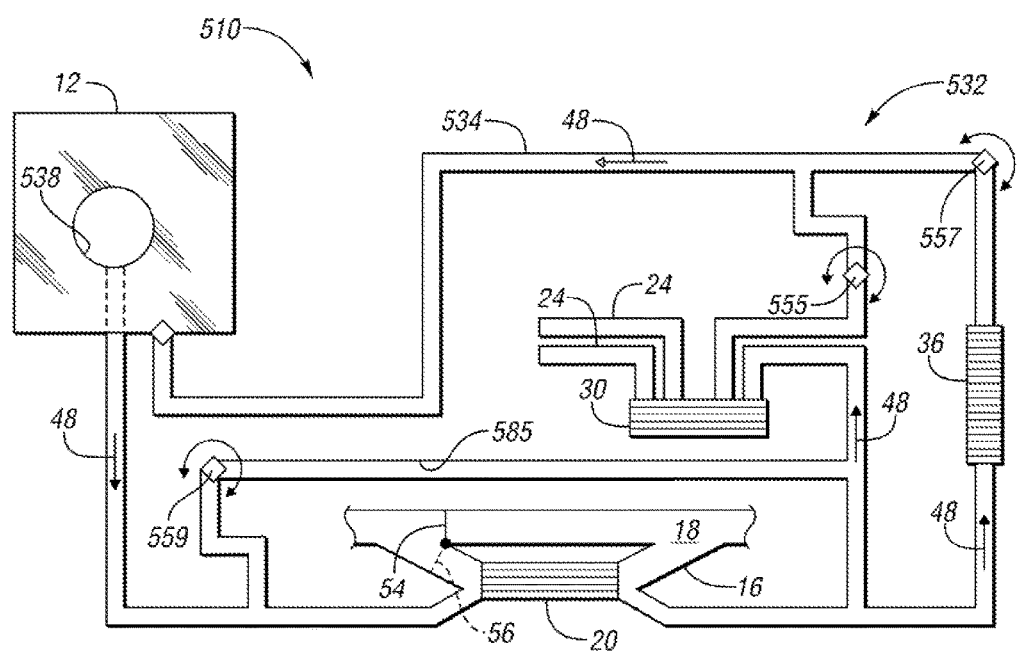
FIG. 6 is a schematic diagram of yet another powertrain having another alternative EGHR system configuration in accordance with the claimed invention.

Referring to FIG. 6, powertrain 510 includes an engine 12, an exhaust system 16 including an exhaust passageway 18 in fluid communication with the engine 12, and an exhaust gas heat exchanger 20. A transmission (not shown in FIG. 6 but substantially identical to the transmission 22 of FIGS. 1 and 3) has a transmission cooling system 24, only a portion of which is shown in FIG. 6, but which is substantially identical to the cooling system 24 shown in FIGS. 1 and 3). The powertrain 510 also includes a transmission heat exchanger 30, a heater core 36, and a pump 538. The pump 538 of FIG. 6 is shown integrated with the engine 12.

An engine coolant circuit 534 provides fluid communication between the engine 12, the exhaust gas heat exchanger 20, the transmission heat exchanger 30, the heater core 36, and the pump 538. The powertrain 510 includes a plurality of variable restriction orifices configured to control the fluid flow through respective portions of the engine coolant circuit 534.

The engine coolant circuit 534 is configured such that the transmission heat exchanger 30 and the heater core 36 are arranged in parallel. The plurality of variable restriction orifices includes a first variable restriction orifice 555 that is configured to control fluid flow (i.e., engine coolant) through the transmission heat exchanger 30. The plurality of variable restriction orifices also includes a second variable restriction orifice 557 that is configured to control fluid flow through the heater core 36.

The engine coolant circuit 534 also defines an exhaust gas heat exchanger bypass 585 in parallel with the exhaust gas heat exchanger 20. The bypass 585 provides fluid communication from the engine 12 to both the heater core 36 and the transmission heat exchanger 30 (which are arranged in parallel). The plurality of variable restriction orifices includes a third variable restriction orifice 559 configured to control fluid flow through the exhaust gas heat exchanger bypass 585.

Coolant 48 in the circuit 534 from the engine 12 flows through either the exhaust gas heat exchanger 20 or the exhaust gas heat exchanger bypass 585, depending on the state of the variable restriction orifice 559. After the coolant 48 has flowed through either the exhaust gas heat exchanger 20 or the exhaust gas heat exchanger bypass 585, the coolant 48 may then flow through either the transmission heat exchanger 30 or the heater core 36. The relative amounts of coolant 48 flowing through either the transmission heat exchanger 30 or the heater core 36 will depend on the states of the variable restriction orifices 555, 557.

After the coolant 48 flows through either of the transmission heat exchanger 30 or the heater core 36, the coolant 48 flows through the engine coolant circuit 534 back to the engine 12 and the pump 538. The EGHR system 532 of FIG. 6 enables a single pump 538, fully blendable flow for each heat exchanger, and maximum/minimum heating and cooling flexibility.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A powertrain comprising:
   an engine including a primary pump incorporated therewith;
   an exhaust system including an exhaust passageway in fluid communication with the engine;
   an exhaust gas heat exchanger;
   a transmission having a transmission cooling system;
   a transmission heat exchanger;
   a heater core;
   an auxiliary pump separate from the primary pump;
   an engine coolant circuit defining a plurality of passageways that connect the auxiliary pump, the engine, the heater core, the transmission heat exchanger, and the exhaust gas heat exchanger in series, with one of the passageways connected to the engine to define an outlet from the engine and another one of the passageways connected to the engine to define a return to the engine; and wherein the auxiliary pump is positioned proximal to the return to the engine or positioned adjacent to the heater core;
   wherein the exhaust gas heat exchanger is operatively connected to the exhaust system and configured to transfer heat between the engine coolant circuit and the exhaust system; and
   wherein the transmission heat exchanger is operatively connected to the transmission cooling system and configured to transfer heat between the engine coolant circuit and the transmission cooling system.

2. The powertrain of claim 1, wherein the engine coolant circuit defines a bypass passageway that bypasses one of the transmission heat exchanger, the heater core, and the auxiliary pump.

3. The powertrain of claim 2, further comprising a valve configured to control fluid flow through the bypass passageway.

4. A powertrain comprising:
   an engine;
   an exhaust system including an exhaust passageway in fluid communication with the engine;
   an exhaust gas heat exchanger;
   a transmission having a transmission cooling system;
   a transmission heat exchanger;
   a heater core configured to transfer heat to a passenger compartment;
   a pump;
   an engine coolant circuit providing fluid communication between the engine, the exhaust gas heat exchanger, the transmission heat exchanger, the heater core, and the pump;
   wherein the exhaust gas heat exchanger is operatively connected to the exhaust system and configured to transfer heat between the engine coolant circuit and the exhaust system;
   wherein the transmission heat exchanger is operatively connected to the transmission cooling system and configured to transfer heat between the engine coolant circuit and the transmission cooling system;
a plurality of variable restriction orifices configured to control fluid flow through respective portions of the engine coolant circuit; and
wherein the plurality of variable restriction orifices includes a first variable restriction orifice that is configured to control fluid flow through the transmission heat exchanger and a second variable restriction orifice that is configured to control fluid flow through the heater core, wherein the transmission heat exchanger and the heater core are arranged in parallel fluid communication.

5. The powertrain of claim 1, wherein the plurality of passageways include a first passageway that provides fluid communication between the engine and the heater core, a second passageway that provides fluid communication between the heater core and the transmission heat exchanger, a third passageway that provides fluid communication between the transmission heat exchanger and the exhaust gas heat exchanger, a fourth passageway that provides fluid communication between the exhaust gas heat exchanger and the auxiliary pump, and a fifth passageway that provides fluid communication between the auxiliary pump and the engine; and wherein the first passageway is the passageway that connects to the engine to define the outlet from the engine and the fifth passageway is the passageway that connects to the engine to define the return to the engine.

6. The powertrain of claim 5, wherein the engine coolant circuit defines a heater core bypass that provides fluid communication between the engine and the transmission heat exchanger; and
wherein the engine coolant circuit includes a heater core bypass valve operatively connected to the engine coolant circuit and configured to control fluid flow through the heater core and the heater core bypass.

7. The powertrain of claim 5, wherein the engine coolant circuit defines a pump bypass that provides fluid communication between the transmission heat exchanger and the engine; and
wherein the engine coolant circuit includes a one-way valve that restricts flow through the pump bypass to one direction.

8. The powertrain of claim 5, wherein the engine coolant circuit defines a transmission heat exchanger bypass that provides fluid communication between the heater core and the exhaust gas heat exchanger; and
wherein the engine coolant circuit includes a transmission heat exchanger bypass valve operatively connected to the engine coolant circuit and configured to control fluid flow through the transmission heat exchanger and the transmission heat exchanger bypass.

9. The powertrain of claim 1, wherein the plurality of passageways include a first passageway that provides fluid communication between the engine and the heater core, a second passageway that provides fluid communication between the heater core and the exhaust gas heat exchanger, a third passageway that provides fluid communication between the exhaust gas heat exchanger and the transmission heat exchanger, a fourth passageway that provides fluid communication between the transmission heat exchanger and the auxiliary pump, and a fifth passageway that provides fluid communication between the auxiliary pump and the engine; and wherein the first passageway is the passageway that connects to the engine to define the outlet from the engine and the fifth passageway is the passageway that connects to the engine to define the return to the engine.

10. The powertrain of claim 9, wherein the engine coolant circuit defines a heater core bypass that provides fluid communication between the engine and the exhaust gas heat exchanger; and
wherein the engine coolant circuit includes a heater core bypass valve operatively connected to the engine coolant circuit and configured to control fluid flow through the heater core and the heater core bypass.

11. The powertrain of claim 9, wherein the engine coolant circuit defines a pump bypass that provides fluid communication between the transmission heat exchanger and the engine; and
wherein the engine coolant circuit includes a one-way valve that restricts flow through the pump bypass to one direction.

12. The powertrain of claim 9, wherein the engine coolant circuit defines a transmission heat exchanger bypass that provides fluid communication between the exhaust gas heat exchanger and the auxiliary pump; and
wherein the engine coolant circuit includes a transmission heat exchanger bypass valve operatively connected to the engine coolant circuit and configured to control fluid flow through the transmission heat exchanger and the transmission heat exchanger bypass.

13. The powertrain of claim 9, wherein the engine coolant circuit defines a heater core bypass that provides fluid communication between the engine and the transmission heat exchanger;
wherein the engine coolant circuit includes a heater core bypass valve operatively connected to the engine coolant circuit and configured to control fluid flow through the heater core and the heater core bypass;
wherein the engine coolant circuit defines an exhaust gas heat exchanger bypass in fluid communication with the heater core bypass; and
wherein the engine coolant circuit includes a one-way valve that restricts flow through the exhaust gas heat exchanger bypass to one direction.

14. The powertrain of claim 4, wherein the engine coolant circuit includes an exhaust gas heat exchanger bypass; and
wherein the plurality of variable restriction orifices includes a third variable restriction orifice configured to control fluid flow through the exhaust gas heat exchanger bypass.

15. The powertrain of claim 1, wherein the plurality of passageways include a first passageway that provides fluid communication between the engine and the heater core, a second passageway that provides fluid communication between the auxiliary pump and the transmission heat exchanger, a third passageway that provides fluid communication between the transmission heat exchanger and the exhaust gas heat exchanger, and a fourth passageway that provides fluid communication between the exhaust gas heat exchanger and the engine; and wherein the first passageway is the passageway that connects to the engine to define the outlet from the engine and the fourth passageway is the passageway that connects to the engine to define the return to the engine.

* * * * *